Inventor
James Glendinning Bone.
By
Attorney.

Patented Feb. 21, 1950

2,498,356

UNITED STATES PATENT OFFICE 2,498,356

LATCH AND MASK ENGAGING MEANS FOR RECTILINEARLY MOVING MEMBERS

James Glendinning Bone, Stockton-on-Tees, England, assignor to The Power-Gas Corporation Limited, Stockton-on-Tees, England, a British company Application August 6, 1947, Serial No. 766,655
In Great Britain November 26, 1942

Section 1, Public Law 690, August 8, 1946
Patent expires November 26, 1962

8 Claims. (Cl. 74—1)

The present invention relates to improvements in control apparatus for use in plants in which various displaceable elements (such as the valves of a water gas plant or a hydrogen manufacturing plant, taken by way of example) are displaced in a predetermined sequence, and of the type in which moving cams control couplings between a constantly reciprocating part and the elements, such as valves, to be displaced.

According to the present invention selective latch couplings are disposed between a constantly reciprocating rectilinearly guided cross-head and the elements to be displaced, such as bars connected to the valves of a gas plant.

The coupling is effected preferably at the time when the reciprocating cross-head is at rest, or substantially so, at the end of a traverse.

The invention is more particularly described with reference to the accompanying drawings, in which—

Figure 1:
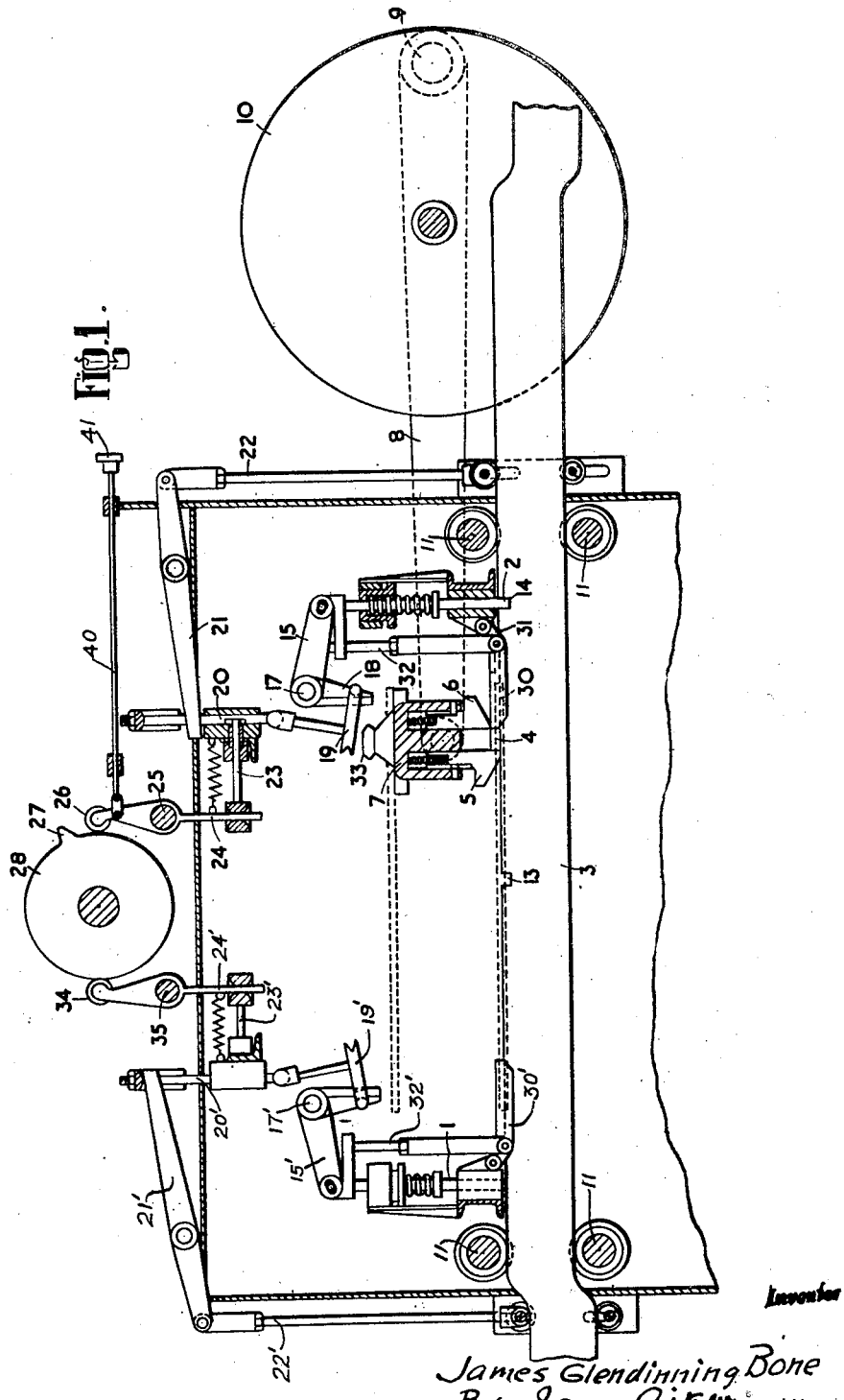
Fig. 1 is a diagrammatic side view of the apparatus.
Figures 2, 5:
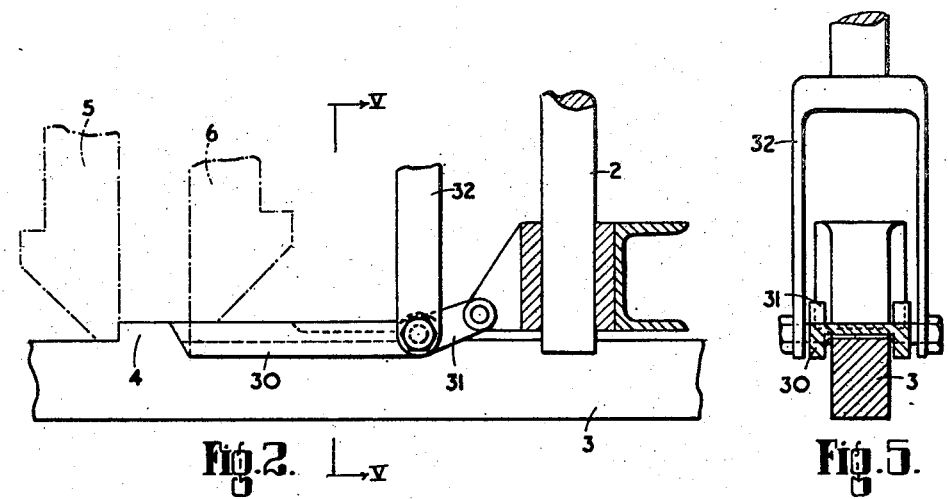
Fig. 2 is a side view on an enlarged scale showing particularly one of the masks and its associated parts.
Fig. 5 is a section on line V—V of Fig. 2.
Figure 3:
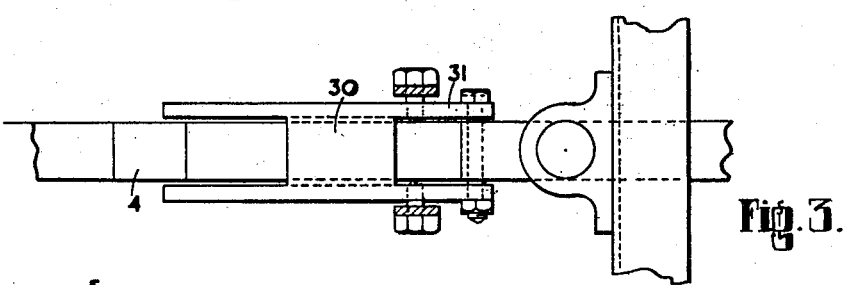
Fig. 3 is a plan view corresponding to Fig. 2.
Figure 4:
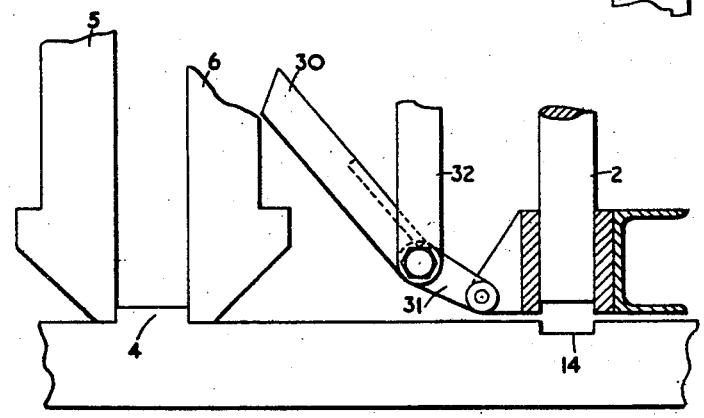
Fig. 4 is a view corresponding to that of Fig. 2 but with the mask in a raised position.

A cross-head 7 is connected by a connecting rod 8 to a crank pin 9 on a continuously rotating crank disc 10, this cross-head 7 having a pair of spring loaded latches 5, 6. These latches may be gravity controlled if desired.

These latches 5, 6 are adapted to cooperate with a projection 4 on the drawbar 3 connected to the valve or the like element to be operated, and longitudinally displaceable between pairs of rollers 11 which drawbar is locked in either of its two end positions by means of stops 1, 2 engaging with notches 13, 14 respectively. These stops 1, 2 are under spring control and are each pivotally connected to one arm 15 of a bell crank lever rotating about a fixed spindle 17, the other arm 18 of which has a connection to a latch 19 connected to a link 20 adapted to be engaged by a pivoted lever 21 connected to the resetting gear 22. Stop pins 23 are connected to a lever 24 pivoted at 25 and having a roller 26 adapted to be operated by a cam projection 27 on the continuously rotating cam disc 28. It will be appreciated that a cam disc 28 will be provided for each drawbar 3.

The cross-head in its reciprocation in the position of the parts shown will not move the drawbar 3 as the latch 6 cannot drop behind the projection 4 because of the arms of a mask 30 pivoted about a fixed point by way of its cranked arm and coupled to a connecting rod 32 connected to the arm 15 of the bell crank lever. When, however, the projection 27 engages the roller 26 and tilts the lever 24 about its pivot 25, then the latch 19 will be dropped into range of a striker 33 mounted on the cross-head 7, so that as this completes its next reciprocation to the right it will engage this striker and turn the bell crank lever 15, 18, about its pivot 17 to raise the rod 32 and thus withdraw the mask 30 from the back of the stop 4. The latch 6 will therefore engage behind this projection 4, and as the connecting rod 8 commences to move to the left it will move with it the drawbar 3 as this has now been unlocked by reason of the stop 2 having been withdrawn from the notch 14 owing to its connection with the arm 15 of the bell crank lever.

Movement of the drawbar 3 in the opposite direction is effected by another cam disc on the same shaft as cam disc 28 engaging the roller 34 of lever 35.

Spindle 40 and knob 41 form part of a hand tripping gear for manually tripping link 20 for test or other purposes.

Parts 15', 17', 19', 20', 21', 22', 23', 24', 30', 32' shown on the left hand side of Figure 1 function in a similar manner to the correspondingly numbered parts shown on the right hand side of Figure 1 and described above.

I declare that what I claim is:

1. In a cyclical control apparatus wherein various parts are to be displaced in pre-determined sequence, at least one constantly reciprocating rectilinearly guided cross-head, a displaceable part associated with said cross-head, at least one latch on said cross-head adapted for driving engagement with said displaceable part, a displaceable mask adapted in one position to render said latch inoperative and in another position to permit driving engagement of said latch with said displaceable part, and cam means governing the position of said mask.

2. In a cyclical control apparatus wherein various parts are to be displaced in pre-determined sequence, at least one constantly reciprocating rectilinearly guided cross-head, a displaceable part associated with said cross-head, at least one latch on said cross-head adapted for driving engagement with said displaceable part, a displaceable mask adapted in one position to render said latch inoperative and in another position to permit driving engagement of said latch with said displaceable part, transmission means for enabling the cross-head to cause movement of said mask from said one position to said other position and cam means controlling said transmission means.

3. In a cyclical control apparatus wherein various parts are to be displaced in pre-determined sequence, at least one constantly reciprocating rectilinearly guided cross-head, a displaceable part associated with said cross-head, at least one latch on said cross-head adapted for driving engagement with said displaceable part, a displaceable mask adapted in one position to render said latch inoperative and in another position to permit driving engagement of said latch with said displaceable part, transmission means for enabling the cross-head to cause movement of said mask from said one position to said other position, cam means controlling said transmission means, locking means for said displaceable part, said locking means being connected to said transmission means to cause the locking means to be disengaged from the displaceable part when the mask is displaced by said transmission means.

4. In a cyclical control apparatus wherein various parts are to be displaced in pre-determined sequence, at least one constantly reciprocating rectilinearly guided cross-head, a displaceable part associated with said cross-head, at least one latch on said cross-head adapted for driving engagement with said displaceable part, a pivoted mask adapted in one angular position to render said latch inoperative and in another angular position to permit driving engagement of said latch with said displaceable part, a bellcrank lever assembly connected with said mask and movable into the path of the cross-head to enable rectilinear movement of the cross-head to actuate the bell crank lever assembly to displace the mask from said one angular position to the other, detent means normally holding said bell crank lever assembly out of the path of the cross-head and cam means adapted to release said detent means to enable the cross-head to displace the mask to permit operative driving engagement of said latch with said displaceable part.

5. In a cyclical control apparatus according to claim 4 a locking device normally preventing movement of said displaceable part, said locking device being connected to said bell crank lever assembly to enable it to be released on actuation of the bell crank lever assembly by the cross-head.

6. In a cyclical control apparatus according to claim 4 means for automatically resetting said bell crank lever assembly in a position out of the path of the cross head during the succeeding stroke of the cross-head.

7. In a cyclical control apparatus wherein various parts are to be displaced in a pre-determined sequence at least one constantly reciprocating rectilinearly guided cross-head, a displaceable part associated with and lying adjacent the path of travel of the cross-head, at least one spring loaded latch on the cross-head adapted at the end of a stroke of the cross-head to enter into driving engagement with said displaceable part, a mask normally lying in the path of said latch to cause the latch to ride onto the mask to prevent it from entering into driving engagement with said displaceable part, a mask normally lying in the path of said latch to cause the latch to ride on to the mask to prevent it from entering into driving engagement with the displaceable part, transmission means operable under the influence of the cross-head to cause the movement of the mask away from the position in which it prevents the latch from driving the engaging said displaceable part, detent means normally rendering said transmission means inoperative and cam means adapted to release said detent means to enable the cross-head to operate said transmission means so as to withdraw the mask from its operative association with the latch so as to enable the latch to enter into the driving engagement with said displaceable part.

8. In a cyclical control apparatus wherein various parts are to be displaced in pre-determined sequence a plurality of constantly reciprocating cross-heads, a plurality of displaceable parts each associated with one of said cross-heads, each cross-head having associated therewith at least one latch mounted thereon and adapted for driving engagement with its associated displaceable part, a displaceable mask adapted in one position to render said latch inoperative and in another position to permit driving engagement of said latch with its displaceable part and a plurality of cams each controlling the position of the mask associated with one of said cross-heads.

JAMES GLENDINNING BONE.

REFERENCES CITED

The following references are of record in the file of this patent:

UNITED STATES PATENTS

| Number | Name | Date |
|---|---|---|
| 2,171,287 | Boone | Aug. 29, 1939 |